(12) United States Patent
Higuchi et al.

(10) Patent No.: US 12,393,473 B2
(45) Date of Patent: Aug. 19, 2025

(54) METHOD FOR DETERMINING PARALLELIZATION AXES COMBINATION FOR SPLIT SCHEME, DETERMINING DEVICE, AND COMPUTING SYSTEM

(71) Applicant: Preferred Networks, Inc., Tokyo (JP)

(72) Inventors: Tomokazu Higuchi, Tokyo (JP); Hiroto Imachi, Tokyo (JP); Tomoya Adachi, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 703 days.

(21) Appl. No.: 17/305,876

(22) Filed: Jul. 16, 2021

(65) Prior Publication Data

US 2022/0019491 A1    Jan. 20, 2022

(30) Foreign Application Priority Data

Jul. 17, 2020    (JP) .................................. 2020-122694

(51) Int. Cl.
*G06F 9/54*    (2006.01)
*G06F 9/48*    (2006.01)
*G06N 3/04*    (2023.01)

(52) U.S. Cl.
CPC ............ *G06F 9/545* (2013.01); *G06F 9/4881* (2013.01); *G06N 3/04* (2013.01)

(58) Field of Classification Search
CPC .......... G06F 9/545; G06F 9/4881; G06N 3/04
See application file for complete search history.

(56) References Cited

U.S. PATENT DOCUMENTS

2009/0113404 A1*    4/2009    Takayama .............. G06F 8/452
717/149

OTHER PUBLICATIONS

Satoshi Ohshima et al., "Proposal and Implementation of Parallel GEMM Routine Using CPU and GPU", vol. 47 No. SIG 12 (ACS 15), Journal of Information Processing Society : computing systems, Sep. 2006.
Junichiro Makino, "GRAPE-DR Detailed understanding", National Astronomical Observatory of Japan, Department of Theoretical Research/Astronomical Simulation Project (CfCA), Jun. 18, 2019 version.
Toru Nishikawa et al. IPSJ SIG Technical Report, "flat-c : The C Programming Language for Massively Parallel Computers", Aug. 5, 2005, p. 163-p. 168.

(Continued)

*Primary Examiner* — Wissam Rashid
(74) *Attorney, Agent, or Firm* — IPUSA, PLLC

(57) ABSTRACT

With respect to a method of determining a split scheme, the method includes calculating, by one or more processors, data related to data transfer time, for each combination of parallelization axes at respective layers of a hierarchical memory computer, based on data transfer methods, a size of a problem to be calculated, and communication bandwidths between the layers. The data transfer methods are determined by the parallelization axes, and the parallelization axes indicate how to split the problem. The method further includes determining, by the one or more processors, a combination of the parallelization axes based on the data related to the data transfer time calculated for each combination of the parallelization axes.

14 Claims, 13 Drawing Sheets

(56) References Cited

OTHER PUBLICATIONS

Junichiro Makino et al, "GRAPE DR", Department of Astronomy, Graduate School of Science, University of Tokyo, Apr. 5, 2006, retrieved from the Internet, <https://www2.ccs.tsukuba.ac.jp/workshop/sympo-060404/pdf/3-7.pdf>.

Junichiro Makino, "Detailed Explanation of GRAPE DR", Center for Computational Astrophysics (CfCA), Feb. 25, 2009, retrieved from the Internet, <https://jun-makino.sakura.ne.jp/talks/tsukuba20090225.pdf>.

* cited by examiner

FIG.3 BROADCAST

Algorithm 1 Search the best combination of partition axes

1: function GETAXESSET(N3)
2:     transfer_time ← ∞
3:     axes_set ← (nil, nil, nil)
4:     for all aL32 ∈ Axes do
5:         for all aL21 ∈ Axes do
6:             for all aL10 ∈ Axes do
7:                 N2 ← PARTITION(N3, aL32, "L32")
8:                 N1 ← PARTITION(N2, aL21, "L21")
9:                 N0 ← PARTITION(N1, aL10, "L10")
10:                tL30 ← MAX(     ▷ Downstream
                    TOSIZED(N3) / GETBW(aL32, "L32"),
                    TOSIZED(N2) / GETBW(aL21, "L21"),
                    TOSIZED(N1) / GETBW(aL10, "L10"))
11:                tL03 ← MAX(     ▷ Upstream
                    TOSIZEU(N1) / GETBW(aL10, "L01"),
                    TOSIZEU(N2) / GETBW(aL21, "L12"),
                    TOSIZEU(N3) / GETBW(aL32, "L23"))
12:                if transfer_time > tL30 + tL03 then
13:                    transfer_time ← tL30 + tL03
14:                    axes_set ← (aL32, aL21, aL10)
15:                end if
16:             end for
17:         end for
18:     end for
19:     return axes_set
20: end function

FIG.11

METHOD FOR DETERMINING PARALLELIZATION AXES COMBINATION FOR SPLIT SCHEME, DETERMINING DEVICE, AND COMPUTING SYSTEM

CROSS-REFERENCE TO RELATED APPLICATIONS

This application is based upon and claims priority to Japanese Patent Application No. 2020-122694 filed on Jul. 17, 2020, the entire contents of which are incorporated herein by reference.

BACKGROUND

1. Technical Field

The disclosure herein may relate to a method of determining a split scheme, a determining device, and a computing system.

2. Description of the Related Art

A parallel computer can perform a calculation process quickly and efficiently by using multiple processors simultaneously. In parallel computing, a problem to be calculated is divided into small tasks and then respective processors process the tasks in parallel. Examples of a parallel computer include a hierarchical memory single instruction multiple data (SIMD) parallel computer used in supercomputers and the like and having a hierarchical memory architecture. Such a computer has a hierarchical structure consisting of N+1 layers in total from a top layer memory (an $L_N$ memory) to a bottom layer memory (an $L_0$ memory). The top layer memory stores data to be calculated and the bottom layer memory is directly connected to a main arithmetic unit.

When implementing a calculation that can be parallelized by a recursive split in a hierarchical memory SIMD computer, there are a wide variety of ways to perform the division, but it is not easy to determine the optimum way to perform the division.

SUMMARY

According to one aspect of an embodiment, with respect to a method of determining a split scheme, the method includes calculating, by one or more processors, data related to data transfer time, for each combination of parallelization axes at respective layers of a hierarchical memory computer, based on data transfer methods, a size of a problem to be calculated, and communication bandwidths between the layers. The data transfer methods are determined by the parallelization axes, and the parallelization axes indicate how to split the problem. The method further includes determining, by the one or more processors, a combination of the parallelization axes based on the data related to the data transfer time calculated for each combination of the parallelization axes.

BRIEF DESCRIPTION OF THE DRAWINGS

FIG. 11 is a pseudo code illustrating a procedure of determining a parallelization axis according to the embodiment of the present disclosure.

DETAILED DESCRIPTION

Figure 1:
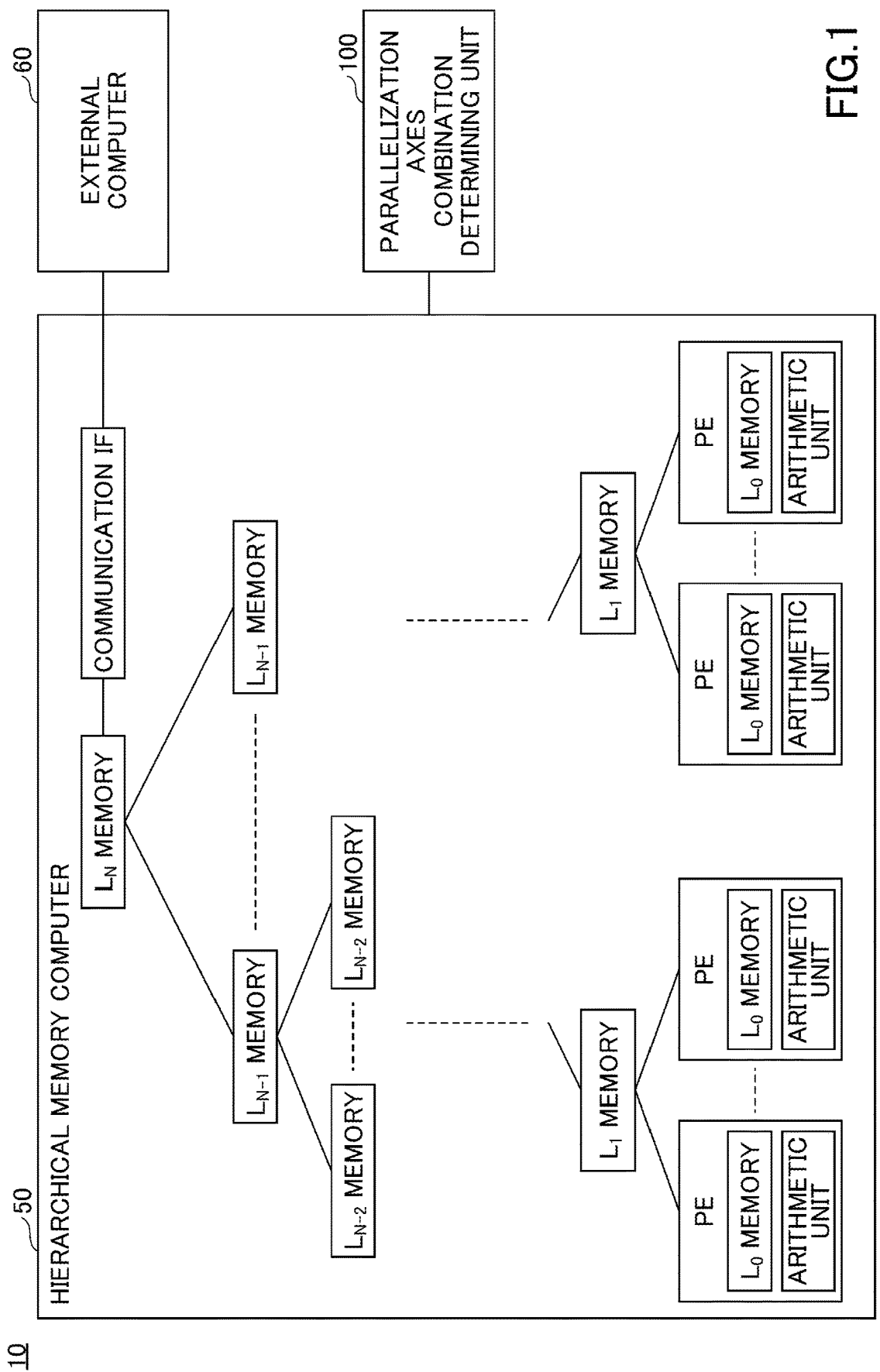
FIG. 1 is a schematic diagram illustrating a computing system according to an embodiment of the present disclosure.

In the following, an embodiment of the present disclosure will be described. In the following embodiment, a method of determining a split scheme in a computer having a hierarchical memory architecture such as a hierarchical memory SIMD parallel computer and a determining device are disclosed.

[Outline of the Present Disclosure]

The outline of the present disclosure may be as follows. The determining device (hereinafter, referred to as the "parallelization axes combination determining device") may calculate, with respect to a problem that can be parallelized by a recursive split, the data transfer time based on data transfer methods determined by parallelization axes, the size of the problem, and communication bandwidths between layers, for each combination of the parallelization axes at the respective layers of the hierarchical memory computer.

The parallelization axis may indicate how to split a problem that can be parallelized by a recursive split. For example, if the problem is a calculation of a dense matrix product A×B=C, methods of splitting the dense matrix product into submatrix products for parallelization may include splitting A in the row direction and splitting A in the column direction, each of which is a parallelization axis. For the problem that can be parallelized by a recursive split, the same parallelization axis may also exist in a problem obtained by splitting the problem. When performing parallelization with a hierarchical memory computer, it may be necessary to determine the parallelization axis at each layer.

Determining the parallelization axis may indicate determining a data transfer method between the layers. If the computer provides a data transfer method corresponding to a parallelization axis between the layers of interest, a split method according to the parallelization axis can be implemented. The data transfer methods typically provided by hierarchical memory computers at each layer include "broadcast", "distribute", "reduce", and "combine", for example. In the above-described example of the dense matrix product, the selection of two parallelization axes can be achieved by a combination of these four data transfer methods.

The main arithmetic unit of the hierarchical memory computer may be directly connected to the $L_0$ memory, and most of the operations may be performed in the main arithmetic unit. Assuming that the total amount of operations does not change significantly according to the selection of the parallelization axis, a difference of processing time caused by the selection may be primarily determined by a difference of the data transfer time between the $L_N$ memory and the $L_0$ memory. Thus, a combination of parallelization axes that minimizes the data transfer time can be optimum for increasing the processing speed of the program. Even if the amount of operations changes as a result of the axis selection, only a combination that minimizes the sum of the data transfer time and the calculation time may be required to be selected, and the parallelization axes combination determining device can be achieved with a simple extension. For example, a case, in which memories of the hierarchical memory computer are three layers, that is, the $L_0$ memory of the lowest layer directly connected to the main arithmetic unit, the $L_1$ memory of a layer next to the $L_0$ memory, and the $L_2$ memory of the highest layer, will be considered. First, the parallelization axes combination determining device may calculate the data transfer time between the $L_0$ memory and the $L_1$ memory and the data transfer time between $L_1$ memory and $L_2$ memory, based on the size of a problem at each layer that is derived from the size of the problem to be calculated (for example, the number of elements of each dimension of a matrix for the problem of obtaining a dense matrix product) and the communication bandwidth between the layers, for each combination of the parallelization axes, that is, all patterns of combinations of the parallelization axes. The largest transfer time among the calculated data transfer time between the layers may be determined as the data transfer time of the parallelization axes combination (step 1). Next, among the data transfer time calculated for each combination of the parallelization axes, the combination of the parallelization axes having the minimum data transfer time may be determined as the optimum parallelization axes combination (step 2). For example, in this specific example, if the data transfer time of the parallelization axes combination, in which the parallelization axis in the $L_0$ memory is in the row direction and the parallelization axis in the $L_1$ memory is in the column direction, is the minimum among all the parallelization axes combinations, the parallelization axes combination determining device determines the parallelization axes combination having the minimum data transfer time as the optimum parallelization axes combination. Here, the term "the parallelization axes combination" may indicate that a combination such as "the row direction at the layer 0, the row direction at the layer 1, and . . . " where the row direction or the column direction is the parallelization axis. The term "all the parallelization axes combinations" may indicate all patterns of the combinations of the parallelization axes, such as "the row direction at the layer 0, the row direction at the layer 1, and . . . , or the row direction at the layer 0, the column direction at the layer 1, and . . . ". The optimum parallelization axes combination may be desired, and it may be necessary to consider "all the parallelization axes combinations" in order to determine the optimum parallelization axes combination.

According to the parallelization axes combination determining device of the present disclosure, the parallelization axis at each memory layer of the hierarchical memory computer, which is manually selected previously, can be automatically selected.

[Computing System]

First, a computing system according to the embodiment of the present disclosure will be described with reference to FIG. 1. FIG. 1 is a schematic diagram illustrating the computing system according to the embodiment of the present disclosure. As illustrated in FIG. 1, the computing system 10 may include a hierarchical memory computer 50, an external computer 60, and a parallelization axes combination determining device 100.

The hierarchical memory computer 50 may include a hierarchical memory from the $L_1$ memory to the $L_N$ memory and multiple processing elements (PEs) each including an arithmetic unit and the $L_0$ memory, and may be, for example, a hierarchical memory SIMD parallel computer. Additionally, the hierarchical memory computer 50 may include a communication interface (IF) for communicating with the external computer 60. The communication IF may be communicatively connected to the $L_N$ memory at the top layer.

For example, if the hierarchical memory computer 50 includes three memory layers for an $L_0$ layer, an $L_1$ layer, and an $L_2$ layer, the $L_2$ memory may be implemented by a dynamic random access memory (DRAM), the $L_1$ memory and the $L_0$ memory may be implemented by a static random access memory (SRAM), and the arithmetic may be implemented by a double precision inner product operator. Here, if the problem to be calculated is a calculation of a dense matrix product (A×B=C), the implementation of the problem indicates that the matrices A and B may be read from the DRAM to the PE and a calculation result C in the PE is written back to the DRAM. Here, some kind of operation, such as reduction, may be performed during writing back to the memory at the top layer.

The external computer 60 may be a computer provided outside of the hierarchical memory computer 50 and is communicatively connected to the hierarchical memory computer 50. The external computer 60 may be any computer, or may be a computer the same as or substantially the same as the hierarchical memory computer 50.

The parallelization axes combination determining device 100 may be communicatively connected to the hierarchical memory computer 50 and determines a combination of parallelization axes at respective memory layers in the hierarchical memory computer 50, as will be described later.

In the illustrated embodiment, the parallelization axes combination determining device 100 may be achieved as an external device independent of the hierarchical memory computer 50, but the parallelization axes combination determining device 100 according to the present disclosure may be mounted in the hierarchical memory computer 50. The parallelization axes combination determining device 100 may be further communicatively connected to the external computer 60 and may determine not only the parallelization axes in the hierarchical memory computer 50 but also the parallelization axes of the hierarchical memory in the external computer 60.

[Parallelization Axes Combination Determining Device]

Figure 2:
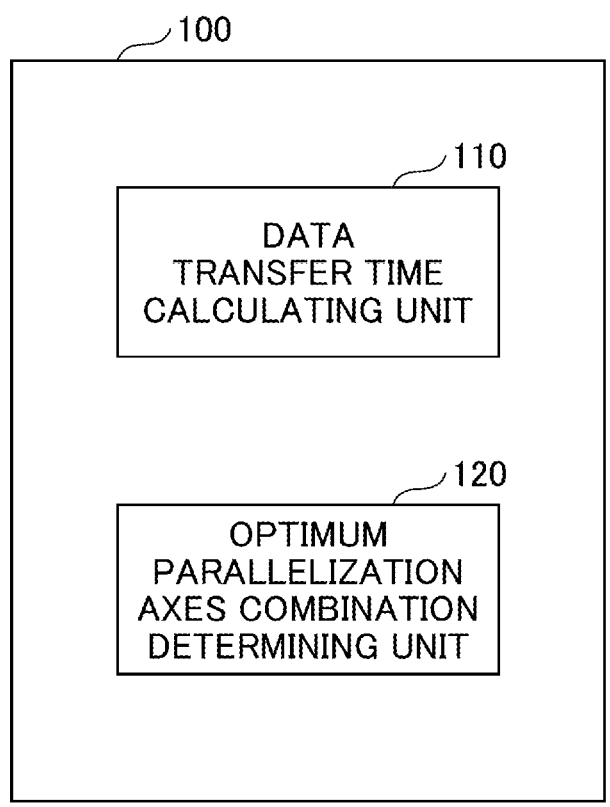
FIG. 2 is a block diagram illustrating a functional configuration of a parallelization axis determining device according to the embodiment of the present disclosure.

Next, the parallelization axes combination determining device 100 according to the embodiment of the present disclosure will be described with reference to FIGS. 2 to 9. FIG. 2 is a block diagram illustrating a functional configuration of the parallelization axes combination determining device 100 according to the embodiment of the present disclosure. As illustrated in FIG. 2, the parallelization axes combination determining device 100 may include a data transfer time calculating unit 110 and an optimum parallelization axes combination determining unit 120.

The data transfer time calculating unit 110 may calculate the data transfer time for each combination of the parallelization axes at respective layers of the hierarchical memory computer 50 based on data transfer methods determined by the parallelization axes, the size of the problem to be calculated, and the communication bandwidths between the layers.

Figure 3:
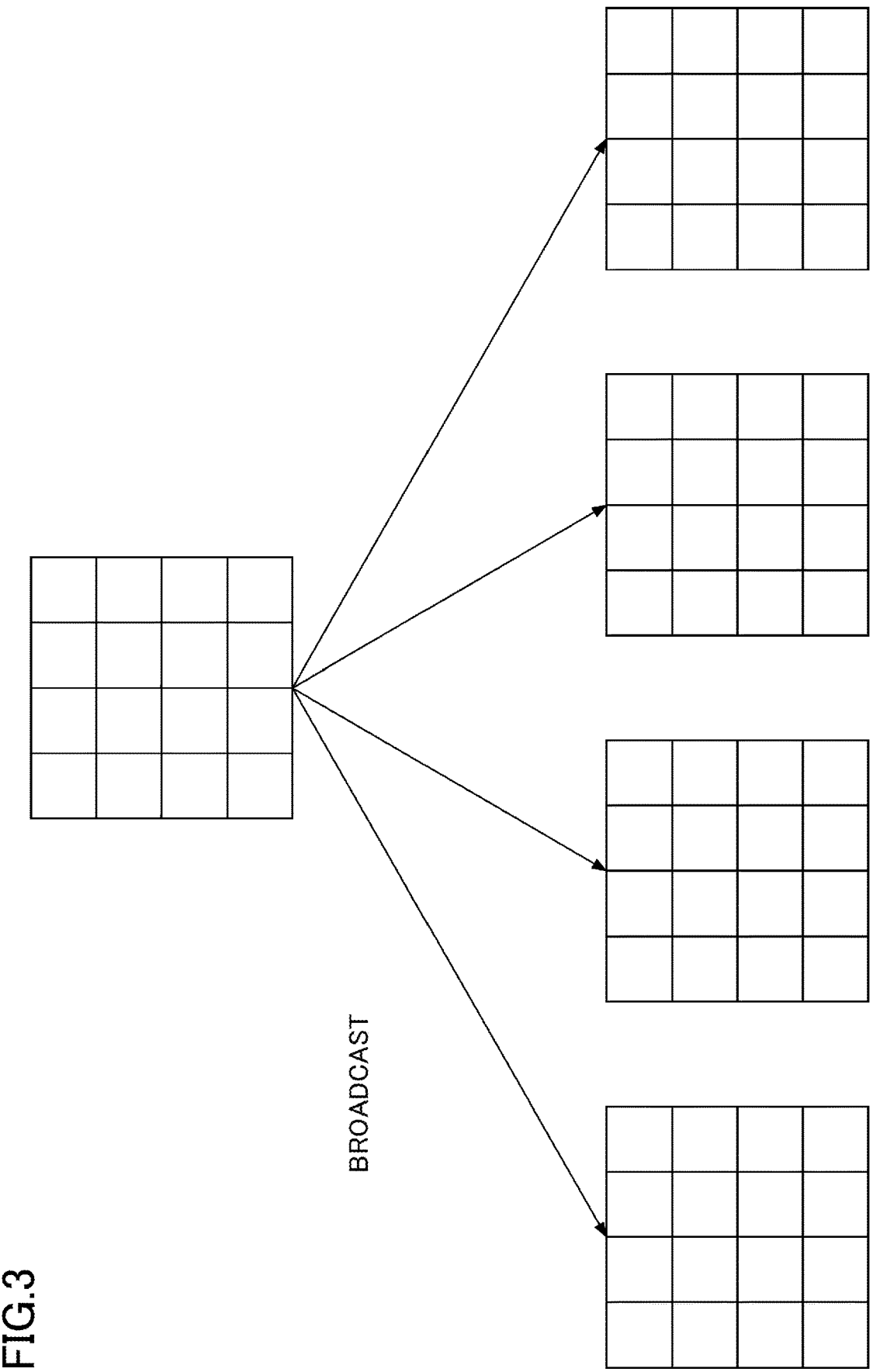
FIG. 3 is a schematic diagram illustrating a data transfer method according to the embodiment of the present disclosure.
Figure 4:
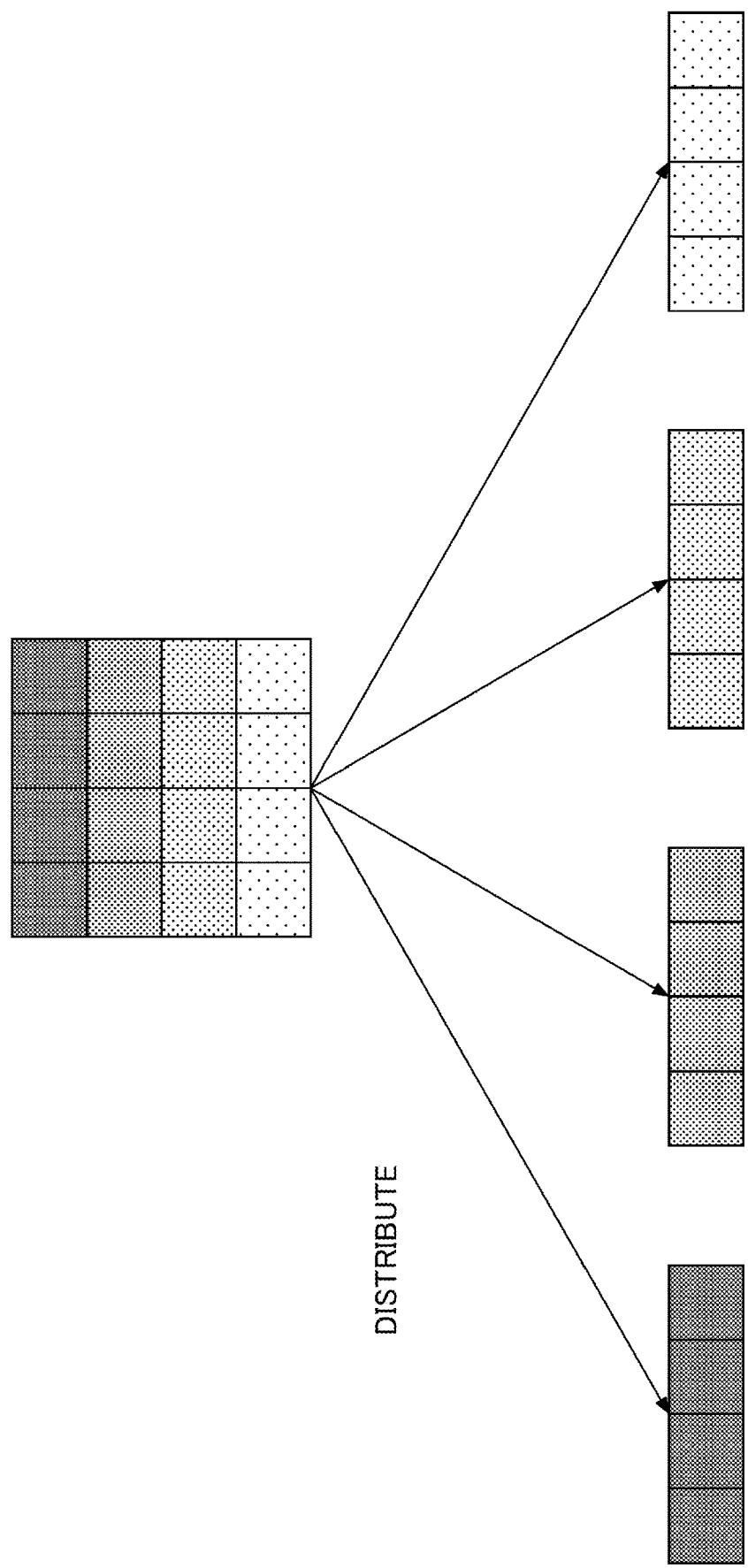
FIG. 4 is a schematic diagram illustrating a data transfer method according to the embodiment of the present disclosure.
Figure 5:
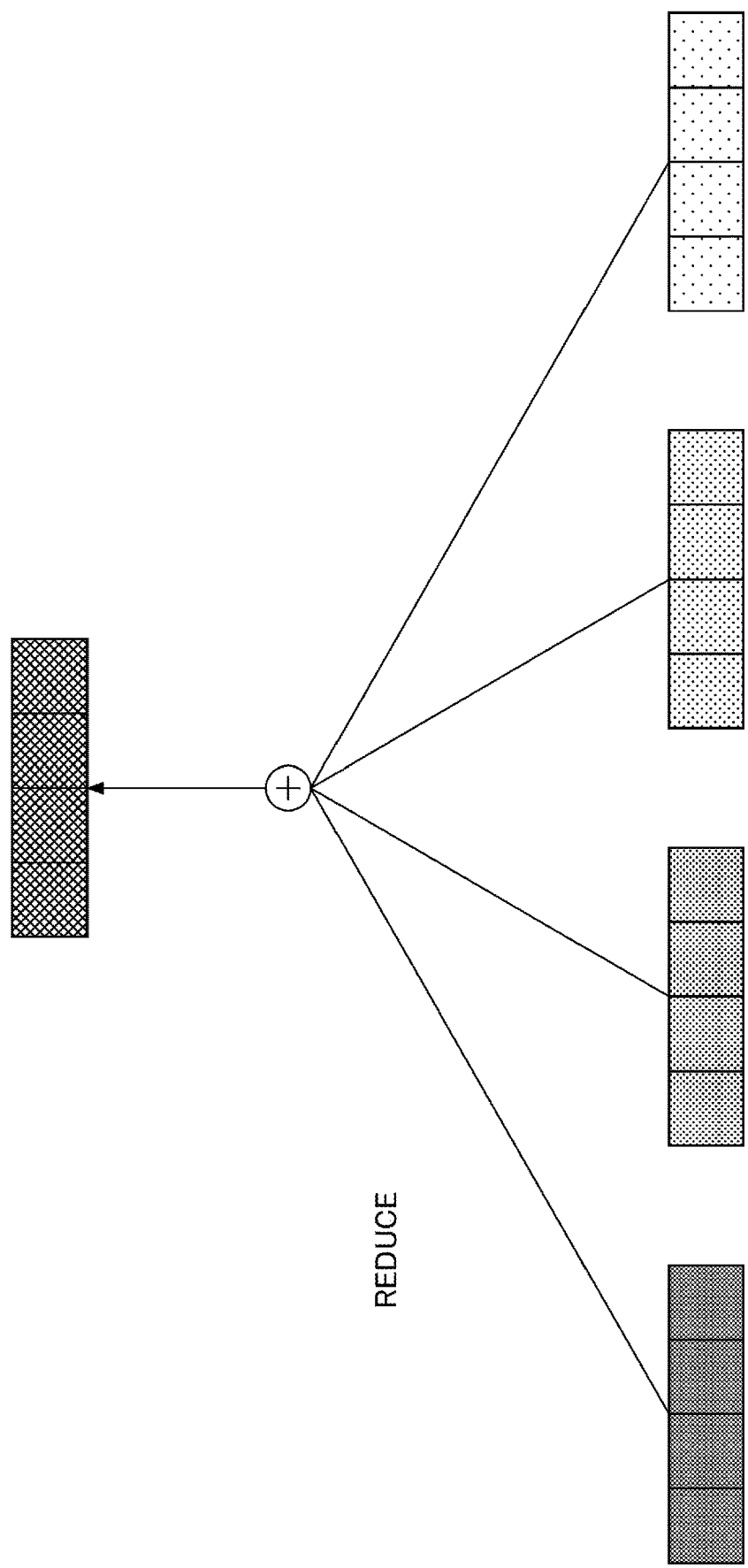
FIG. 5 is a schematic diagram illustrating a data transfer method according to the embodiment of the present disclosure.
Figure 6:
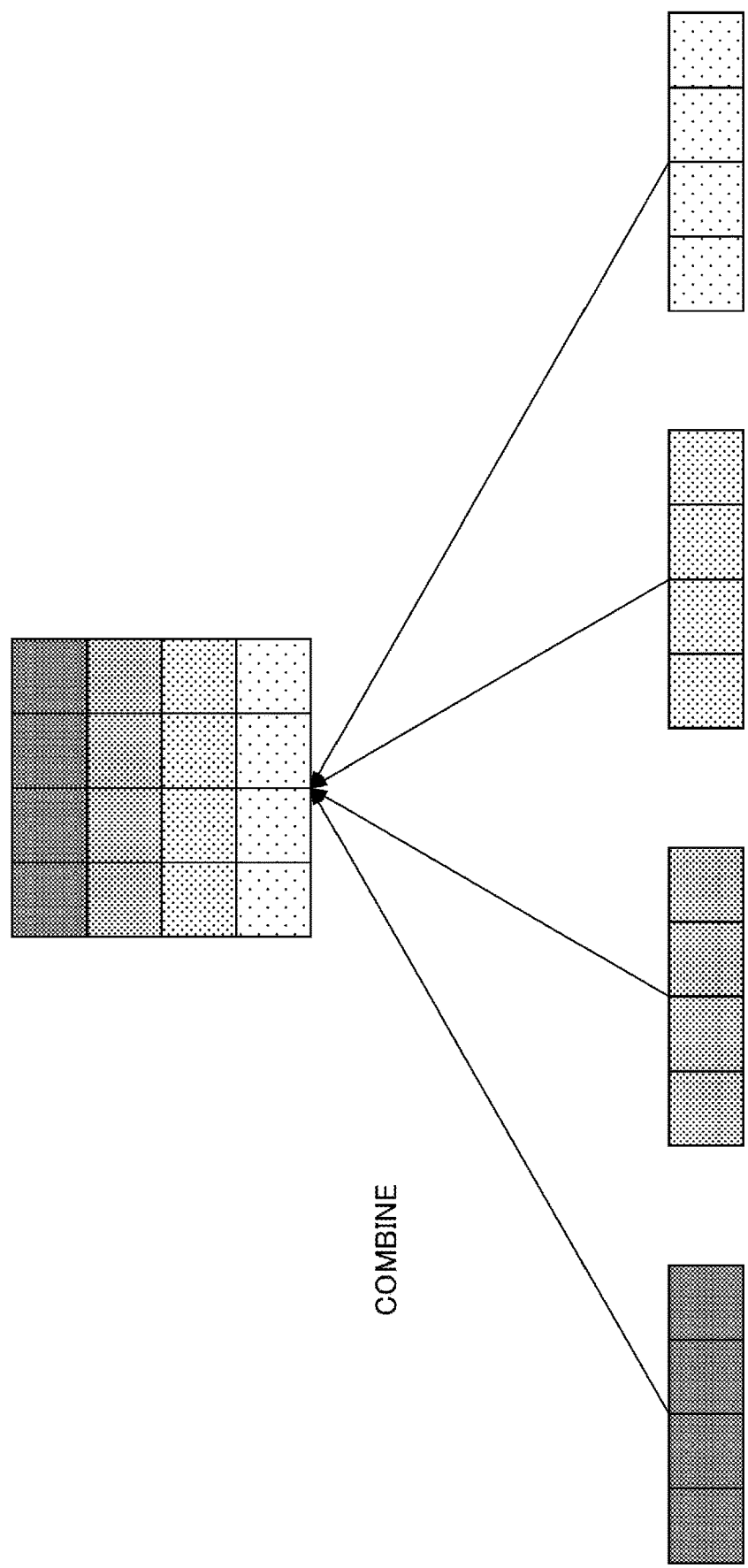
FIG. 6 is a schematic diagram illustrating a data transfer method according to the embodiment of the present disclosure.

For example, the data transfer method may include "broadcast", "distribute", "reduce", and "combine". "Broadcast", as illustrated in FIG. 3, is a data transfer method by which the same data may be transferred from a source memory to all destination memories connected to the source memory. "Distribute", as illustrated in FIG. 4, may be a data transfer method by which data equally divided is transferred from the source memory to all the destination memories connected to the source memory. "Reduce", as illustrated in FIG. 5, may be a data transfer method by which data of the same size may be read from all the source memories connected to the destination memory, and a result obtained by executing a given operation (for example, sum) may be transferred to the destination memory. "Combine", as illustrated in FIG. 6, may be a data transfer method by which data of the same size is read from all source memories connected to the destination memory, and a result obtained by combining the read data may be transferred to the destination memory.

However, any other suitable data transfer method may be used. Such a data transfer method can be used if there is a hardware implementation at each layer.

The data transfer time calculating unit 110 may calculate the data transfer time between the layers for all combinations of the parallelization axes in the memory layers in the hierarchical memory computer 50. For example, if the hierarchical memory computer 50 includes three memory layers $L_0$, $L_1$, and $L_2$, and the problem to be calculated has two parallelization axes, two parallelization axes may be selected for each of the memory layer $L_1$ and the memory layer $L_0$, so that the number of the parallelization axes combinations is $2^2$. The data transfer time calculating unit 110 may calculate the data transfer time for all of these $2^2$ parallelization axes.

When the parallelization axes combination is determined, the data transfer time calculating unit 110 can determine the problem size for each layer with respect to the problem to be calculated. For example, if the problem to be calculated is to obtain the matrix product (A×B=C), there may be two parallelization axes that are the column direction and the row direction, and the problem size may be a set of the number of rows of A (=the number of rows of C), the number of columns of A (=the number of rows of B), and the number of columns of B (=the number of columns of C).

Figure 7:
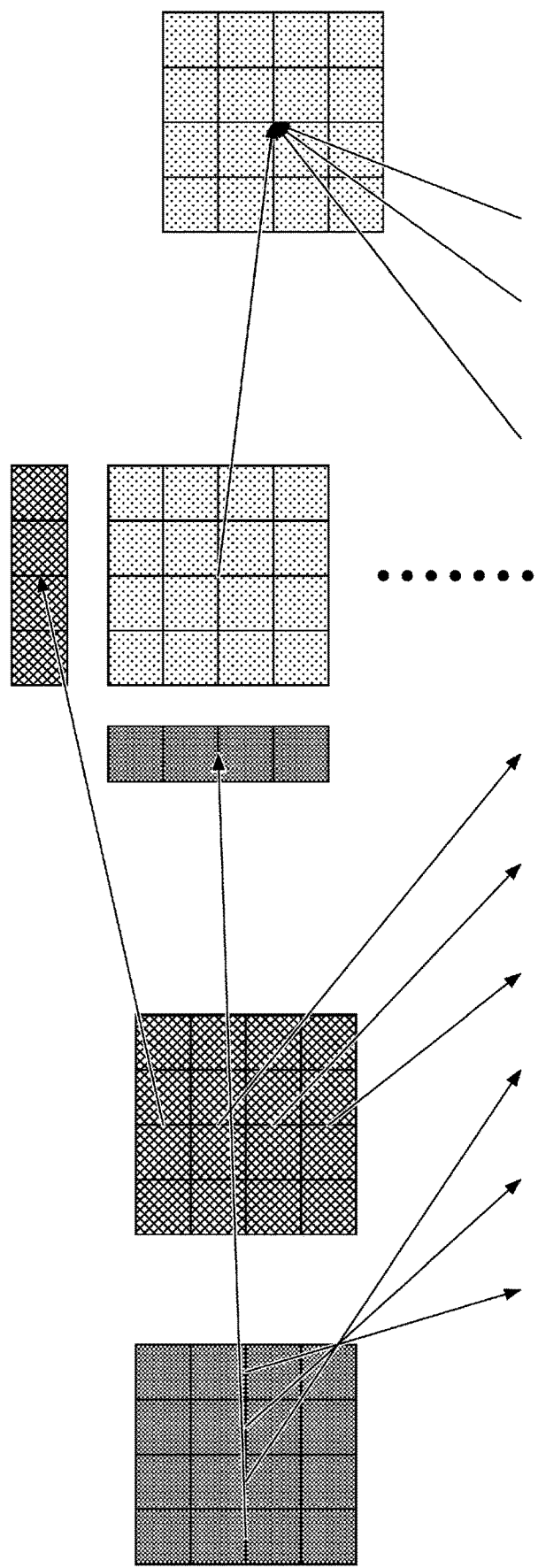
FIG. 7 is a schematic diagram illustrating a data transfer process according to the embodiment of the present disclosure.

In the parallelization in the column direction, as illustrated in FIG. 7, the matrix A may be decomposed in the column direction and the matrix B may be decomposed in the row direction, and multiple matrices obtained by respectively multiplying submatrices subA and subB may be added to obtain the matrix product C. In this case, "distribute" may be used to decompose the matrices A and B, and "reduce" may be used to add the multiple matrices obtained by multiplying the respective submatrices. The parallelization in the column direction may reduce the number of columns of A in the next layer.

Figure 8:
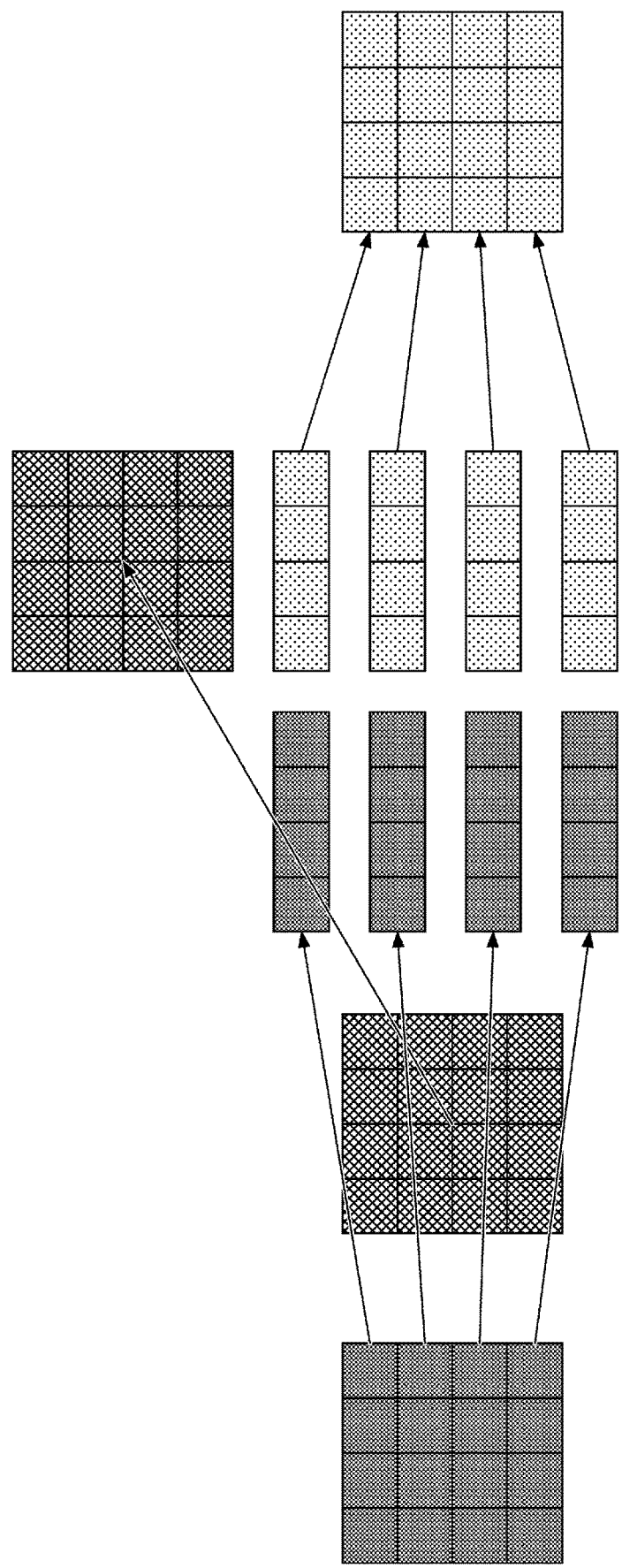
FIG. 8 is a schematic diagram illustrating a data transfer process according to the embodiment of the present disclosure.

In the parallelization in the row direction, as illustrated in FIG. 8, the matrix A may be decomposed in the row direction, and multiple submatrices obtained by multiplying respective submatrices by the matrix B may be combined to obtain the matrix product C. In this case, "distribution" may be used to decompose the matrix A, "broadcast" may be used for matrix B, and "combine" may be used to combine the multiple matrices obtained by multiplying respective submatrices. The parallelization in the row direction may reduce the number of rows of A in the next layer.

The optimum parallelization axes combination determining unit 120 may determine a specific combination of the parallelization axes based on the data transfer time calculated for each combination of parallelization axes. For example, by combining the two parallelization axes described above, the matrix product illustrated in FIG. 9 can be calculated. In the illustrated embodiment, the memory layer includes four layers, and the parallelization axis may be independently determined in each of the memory layer. Specifically, the parallelization axes of the layer 2, the layer 1, and the layer 0 may be respectively the row direction, the row direction, and the column direction. The corresponding data transfer methods may be, with respect to the matrix A, all of data transfer methods in the layer 3→the layer 2, the layer 2→the layer 1, and the layer 1→layer 0 may be "distribute", and with respect to matrix B, the data transfer methods in the layer 3→the layer 2, the layer 2→the layer 1, and the layer 1→the layer 0 may be respectively "broadcast", "broadcast", and "distribute". With respect to the matrix C, the data transfer methods in the layer 0→the layer 1, the layer 1→the layer 2, and the layer 2→the layer 3 may be respectively "reduce" with sum, "combine", and "combine".

Figure 9:
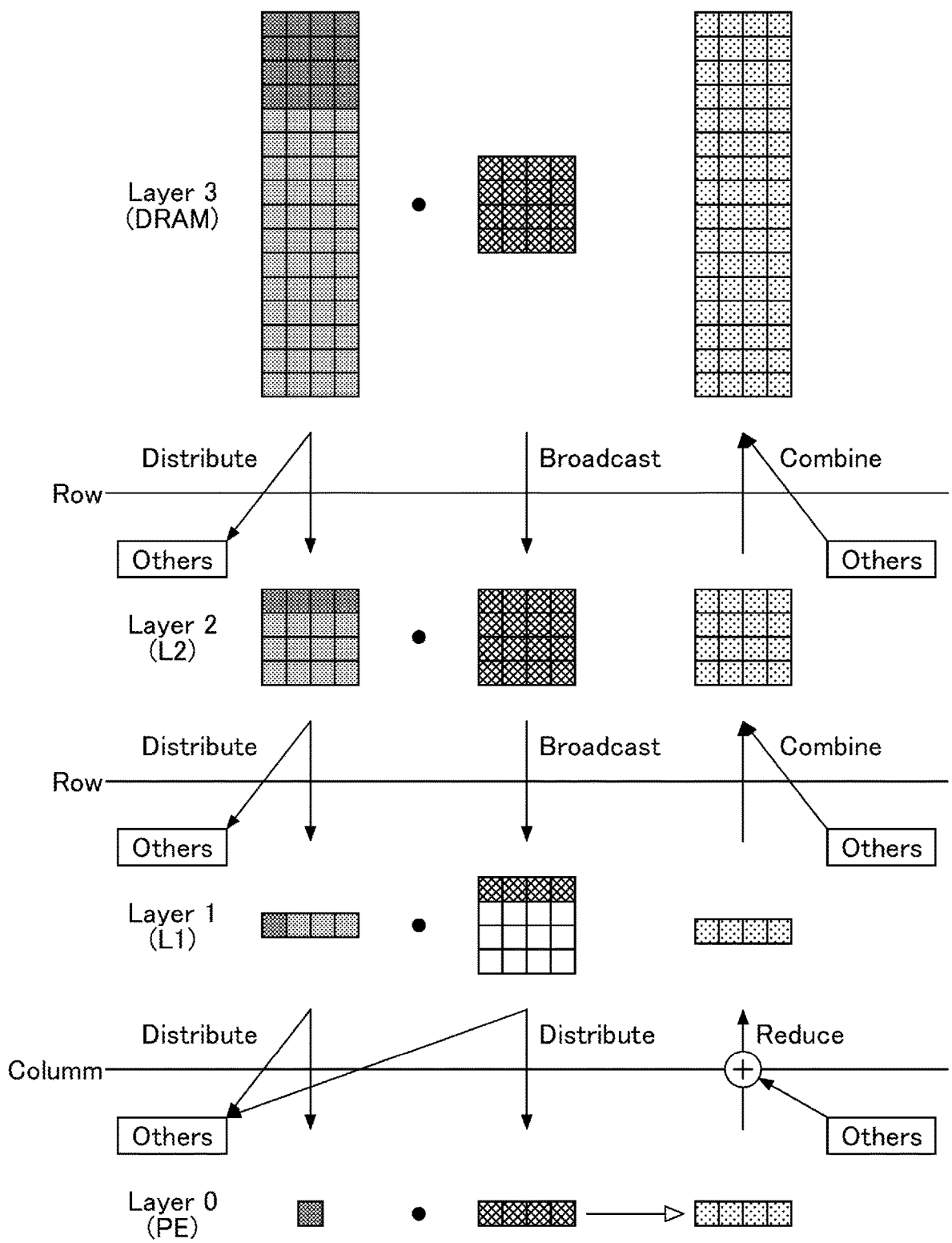
FIG. 9 is a schematic diagram illustrating a data transfer process according to the embodiment of the present disclosure.

As illustrated in FIG. 9, the matrices A and B may be decomposed in submatrices and transferred from the layer 3 to the layer 0 based on the parallelization axis at each layer, and the calculation results at the layer 0 may be collected through the data transfer methods from the layer 0 to the layer 3 to obtain the matrix product C at the layer 3.

When the parallelization axes are given to a problem for which such a divide-and-conquer method is effective (e.g., the matrix product calculation and the like) and the parallelization axis is determined at each layer, the problem size at each layer can be determined recursively, and thus the data transfer time can be estimated. If a relationship between the selection of the parallelization axis and the data transfer time is found, the optimum parallelization axes combination determining unit 120 can automatically determine a parallelization axes combination that minimizes the data transfer time, and the determined parallelization axes combination is considered to be optimum.

[Process of Determining the Parallelization Axis]

Figure 10:
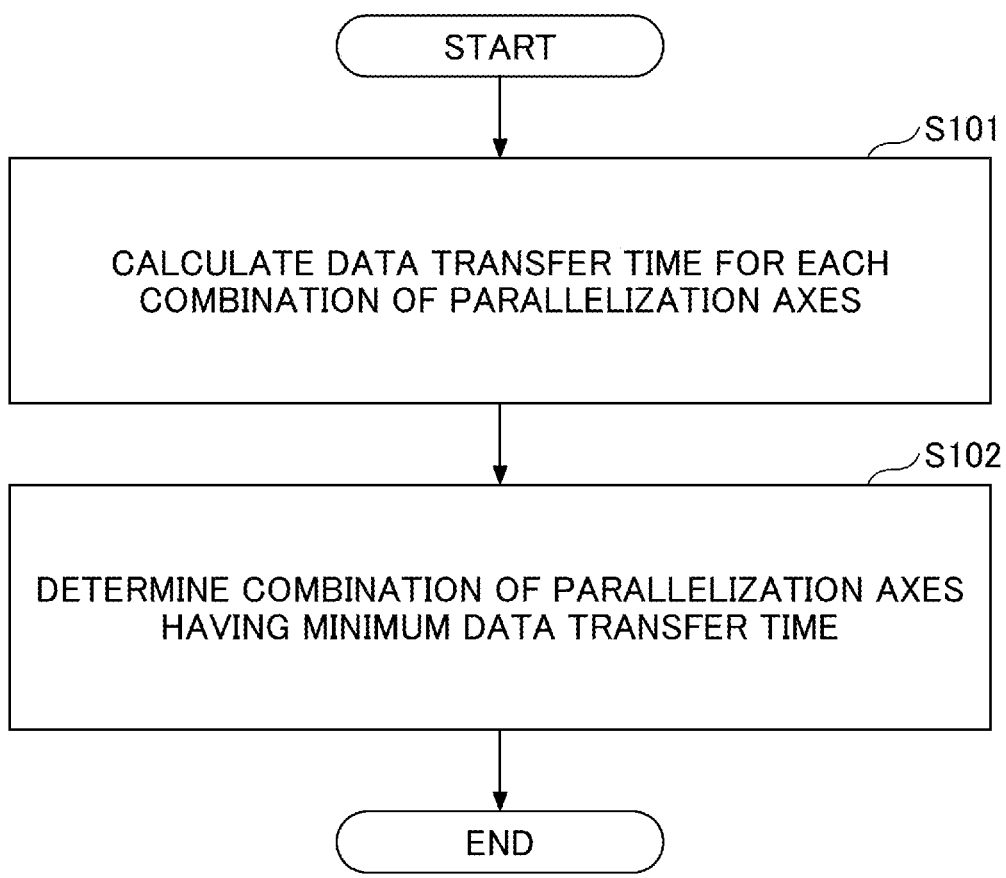
FIG. 10 is a flowchart illustrating a process of determining a parallelization axis according to the embodiment of the present disclosure.

Next, a process of determining the parallelization axis for achieving the split scheme according to the embodiment of the present disclosure will be described with reference to FIG. 10 and FIG. 11. The process of determining the parallelization axis may be performed by the parallelization axes combination determining device 100 described above, and more particularly, by a processor of the parallelization axes combination determining device 100. FIG. 10 is a flowchart illustrating the process of determining the parallelization axis according to the embodiment of the present disclosure.

As illustrated in FIG. 10, in step S101, the parallelization axes combination determining device 100 may calculate the data transfer time based on the size of the problem to be calculated and the communication bandwidths between the layers, for each combination of the parallelization axes at respective layers of the hierarchical memory computer 50. Specifically, the parallelization axes combination determining device 100 may calculate the data transfer time in a data transfer method determined by the parallelization axis for each memory layer of the hierarchical memory computer 50. For example, the parallelization axes combination determining device 100 may calculate the data transfer time from the top layer (i.e., the $L_N$ layer) to the bottom layer (i.e., the $L_0$ layer) in the downstream direction and the data transfer time from the bottom layer (i.e., the $L_0$ layer) to the top layer (i.e., the $L_N$ layer) in the upstream direction for each combination of the parallelization axes, may determine the data transfer time of each combination of the parallelization axes based on the data transfer time in the downstream direction and the data transfer time in the upstream direction, and, for example, may determine the data transfer time of each combination as the sum of the data transfer time in the downstream direction and the data transfer time in the upstream direction.

Here, when a specific data transfer method cannot be used due to constraints of the hierarchical memory computer 50, a combination including a parallelization axis requiring the data transfer method that cannot be used may be eliminated.

In step S102, the parallelization axes combination determining device 100 may determine a combination of parallelization axes having the minimum data transfer time among the data transfer time calculated for each combination of the parallelization axes, as an optimum parallelization axes combination. That is, among all possible parallelization axes combinations calculated in step S101, the parallelization axes combination determining device 100 may identify a combination of parallelization axes that achieves the minimum data transfer time, and may determine the identified combination of parallelization axes as the optimum parallelization axes combination.

FIG. 11 is a pseudo-code illustrating a procedure of determining the parallelization axis according to the embodiment of the present disclosure. The procedure of determining the parallelization axis may be performed by the parallelization axes combination determining device 100 for the hierarchical memory computer 50 including four memory layers. In the present embodiment, for the problem of performing the dense matrix product calculation, it may be independently selected which of the parallelization axes in the column direction and the row direction may be used in each layer except for L3, and a combination of the parallel axes that achieves the minimum data transfer time may be determined as the optimum parallelization axes combination. The number of selection patterns of parallelization axes combinations may be (the number of candidates of the parallelization axis)^(the number of layers−1), and in this example, 2^(4−1)=8. Because it is assumed that the number of the selection patterns is also sufficiently small in the actual example, the optimum parallelization axes combination can be determined by using an exhaustive search.

First, with respect to the layers 0 to 3, as with the embodiment illustrated in FIG. 9, the layer 3 may correspond to the top layer and the layer 0 may correspond to the bottom layer in the PE.

Next, L[n][m], n, m∈{0,1,2,3} may be a string intended to link a layer n to a layer m, and may modify a directional operation between layers, such as data transfer. As an exception, the parallelization axis set between layers may be not directional, but this string may be used for convenience.

A variable transfer_time may represent the minimum data transfer time of the sum of the maximum value among the data transfer time from the layer 3 to the layer 2, the data transfer time from the layer 2 to the layer 1, and the data transfer time from the layer 1 to the layer 0 in the downstream direction and the maximum value among the data transfer time from the layer 0 to the layer 1, the data transfer time from the layer 1 to the layer 2, and the data transfer time from the layer 2 to the layer 3 in the upstream direction. Initially, the variable transfer_time may be set to infinity.

A variable axes_set may represent a combination of parallelization axes selected at the layers when the variable transfer_time is updated. Initially, the variable axes_set may be set to (nil, nil, nil).

A constant Axes may represent candidates of the parallelization axis, and in the present embodiment, the constant Axes may be set to Axes={the column direction, the row direction}.

A variable aL[i][i−1]∈Axes, i∈{1,2,3} may represent a parallelization axis used when the problem is split from the layer i to the layer i−1.

Variables N0, N1, N2, and N3 may respectively represent the problem sizes at the layers 0, 1, 2, and 3 (which will be also referred to as the problem sizes N0, N1, N2, and N3). A variable N[i] may be represented, for example, by a tuple of one or more of the number of elements. In the example of the matrix product, the variable N[i] may be represented by a tuple of two of the number of elements. In addition, the order relationship between the problem sizes may be defined. For example, in the matrix product, if N[i]=(m[i], n[i], k[i]), i∈{0, 1, 2, 3}, m2>m1, n2>n1, and k2>k1, then N2>N1.

A function Partition (N, axis, layers) may return the problem size when N is split based on the parallelization axis specified by "axis". The term "layers" may be an argument that specifies which layer is of interest for split, and may be used to set parameters required for the split. In the pseudo code, the problem size of the layer i−1 may be determined from the problem size of the layer i and the parallelization axis aL[i][i−1], and N0 may be calculated from N3 recursively. Here, when N[i] and N[i−1] may be associated in one-to-one correspondence in a state in which the parallelization axis and various parameters may be fixed, the problem size of the upper layer can be calculated based on the problem size of the lower layer in principle. That is, when the parallelization axes combination and any one of the problem sizes N0, N1, N2, and N3 are determined, the problem sizes of the remaining layers may be also uniquely determined. In FIG. 11, by fixing the problem size N3 (i.e., fixing the calculation procedure), the parallelization axis may be searched. Here, if the problem size N' where N3≥N' is to be solved, the problem can be calculated. If N3≥N' is not satisfied, it may be conceivable that the problem size N' to be solved is split and calculated multiple times.

Here, for the layer 0, a lower limit value of the problem size that can be efficiently calculated by the arithmetic unit can be considered. For example, the number of elements that can be processed by the internal product arithmetic unit at one time and the number of parallel executions required to hide the latency of the arithmetic unit or the $L_0$ memory affect the lower limit value. With respect to above, an upper limit value of the size of the problem that can be calculated can be considered in terms of the memory capacity. For example, in the matrix product calculation, if matrices A0 and B0 multiplied by one PE, and the result matrix C0 are stored in the $L_0$ memory, a possible maximum value of N0 can be calculated from the size of the $L_0$ memory. The upper limit value of the problem size due to the memory capacity can be similarly considered for layers other than the layer 0.

A function ToSizeD(N) may calculate the amount of data, required by the problem represented by N, transferred in the downstream direction from the layer 3 to the layer 0. The function ToSizeU(N) may calculate the amount of data, required by the problem represented by N, transferred in the upstream direction from the layer 0 to the layer 3. In the example of the matrix product, the data transferred in the downstream direction may be the matrix A and the matrix B, and thus ToSizeD(N1)=m1×k1+k1×n1. The data transferred in the upstream direction may be the matrix C, and thus ToSizeU(N1)=m1×n1.

A function GetBW (axis, layers) may calculate the communication bandwidth when an axis specified by "axis" is selected for the data transfer between layers specified by "layers".

A variable tL30 may represent the data transfer time from the layer 3 to the layer 0 and is calculated based on the problem sizes and the communication bandwidths. A variable tL03 may represent the data transfer time from the layer 0 to the layer 3. In hierarchical memory computers, the communication between layers that requires the greatest amount of time may be a bottleneck, because the communication between layers can be overlapped in most cases. The overlap of the communication between layers may indicate, for example, that the communication from the layer 2 to the layer 1 is started before the communication from the layer 3 to the layer 2 is completed. By using this, a maximum value max of the data transfer time of the communication between layers among all layers may be used for the calculation. That is, the data transfer time of each combination of the parallelization axes may be calculated based on the calculated maximum value of the data transfer time required for each communication between layers. For a hierarchical memory computer that cannot overlap the communication between layers, the sum of all communication time between layers may be employed.

As can be seen from the illustrated pseudocode, for all combinations of the parallelization axes of the layers, first, the problem sizes N2, N1, and N0 of respective layers may be sequentially determined from the given problem size N3. The data transfer time tL30 in the downstream direction and the data transfer time tL03 in the upstream direction may be determined based on the problem size and the communication bandwidth at each layer. If the total data transfer time may be less than the current transfer_time, the total data transfer time may be set to a new transfer_time, and the combination of the parallelization axes may be set to axes set. The process may repeat for all the combinations of the parallelization axes, and the combination ultimately may set to the axes_set is the optimum parallelization axes combination.

For example, in the embodiment illustrated in FIG. 9, the problem size N3 may be represented as (16, 4, 4), because aL32, aL21, and aL10 are respectively "row", "row", and "column", and the problem at the layer 3 may be the product of the 16×4 matrix and the 4×4 matrix. Next, in N2=Partition (N3, aL32, "L32"), because the problem at the layer 3 may be split by "row" (i.e., a row direction split), the problem at the layer 2 may be a product of the 4×4 matrix and the 4×4 matrix, and N2 may be represented as (4, 4, 4). Similarly, problem sizes N1 and N0 may be expressed as (1, 4, 4) and (1, 1, 4), respectively. Note that only the split for N0 may be performed by "column". The communication bandwidth between layers may be determined from a chip specification. As described, the data transfer time tL30 in the downstream direction and the data transfer_time tL03 in the upstream direction may be determined based on the problem size and the communication bandwidth at each layer.

[Simulation Results]

Figure 12:
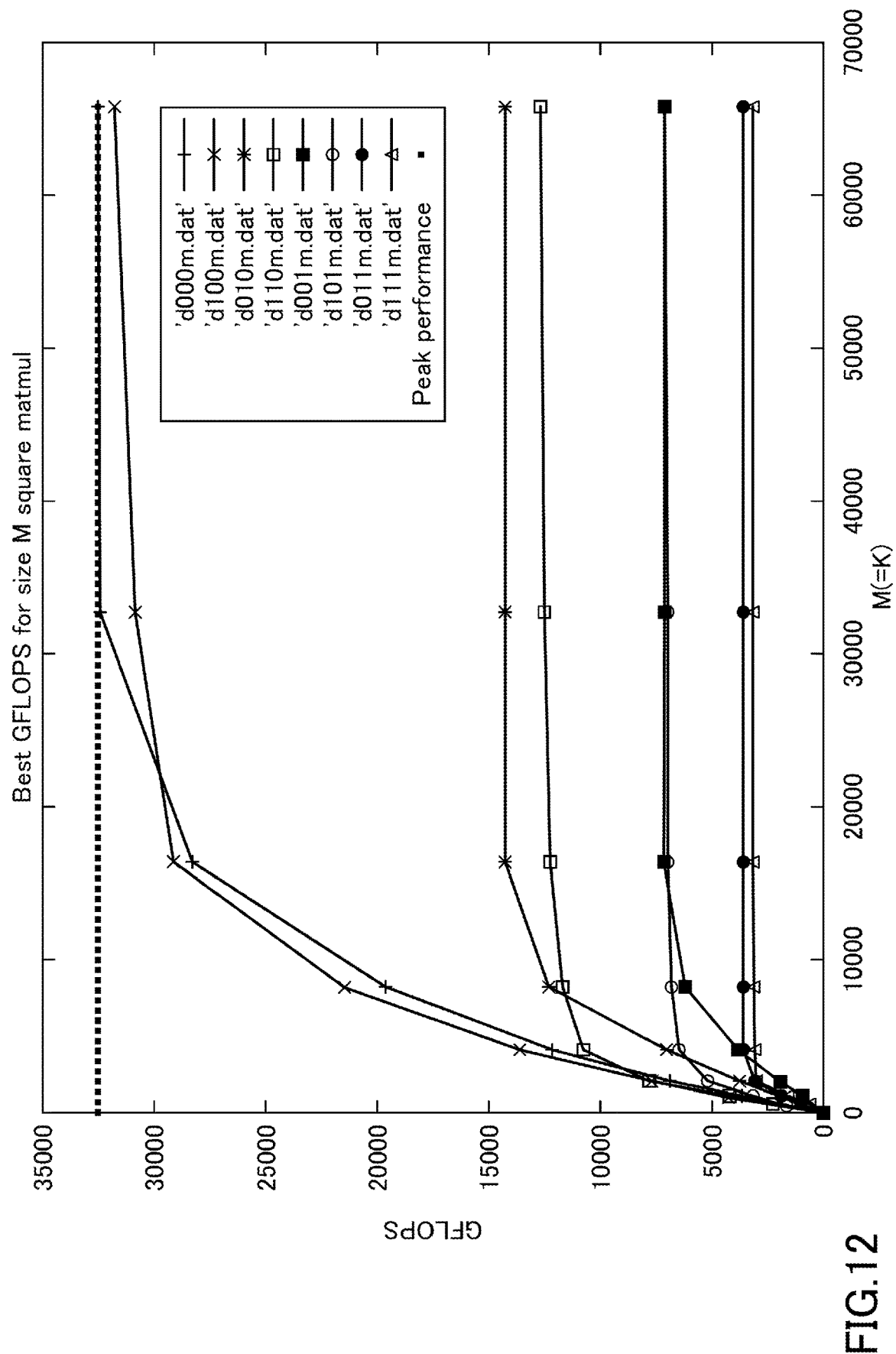
FIG. 12 is a graph illustrating simulation results according to the embodiment of the present disclosure.

Next, simulation results according to the embodiment of the present disclosure will be described with reference to FIG. 12. FIG. 12 is a graph illustrating simulation results according to the embodiment of the present disclosure.

In the graph of FIG. 12, d(0|1) (0|1) (0|1)m.dat indicates that the leftmost (0|1) represents that the parallelization axis at the layer 2 is in the column direction or the row direction, the middle (0|1) represents that the parallelization axis at the layer 1 is in the column direction or the row direction, and the rightmost (0|1) represents that the parallelization axis at the layer 0 is in the column direction or the row direction.

It can be found that when the matrix size M is large, it may be most efficient to use "column" (i.e., the column direction split) for the data transfers between the layers among all layers, while when the matrix size M is small, it may be efficient to use "row" (i.e., the row direction split) only for the data transfer between the layer 3 and the layer 2. Additionally, some combinations of transfer methods may have significantly lower estimated maximum efficiency. This may be because the combinations of data transfer methods do not provide submatrices having sufficient size to multiple PEs throughout a computer.

The above-described embodiment may have been described focusing on the double-precision general matrix multiplication (DGEMM) A×B=C, but the present disclosure may be applicable to, for example, C=αA×B, C+=A×B, a single-precision general matrix multiplication (SGEMM), a half-precision general matrix multiplication (HGEMM), level 3 BLAS operations, and the like. The present disclosure may be also applicable to fully connected layers and convolution layers in a neural network. Although the procedure, in which the calculation results are written back to the top layer, has been described, the present disclosure may be applicable when the calculation results placed at any lower layer are reused as input data for another calculation. For example, in the above-described convolution layer in the neural network, a batch direction, a spatial direction, and a channel direction may be candidates as the parallelization axis.

[Hardware Configuration of the Parallelization Axes Determining Device]

In the parallelization axes combination determining device 100 according to the embodiment, each function may be an analog circuit, a digital circuit, or a circuit including an analog-digital mixed circuit. Additionally, the parallelization axes combination determining device 100 may include a control circuit that controls each function. The implementation of each circuit may be an application specific integrated circuit (ASIC), a field programmable gate array (FPGA), or the like.

In all of the above descriptions, at least a part of the parallelization axes combination determining device 100 may be configured by hardware, or may be configured by software and implemented by a central processing unit (CPU) or the like performing information processing of the software. When the parallelization axes combination determining device 100 is configured by software, a program that implements a function of at least a part of the parallelization axes combination determining device 100 may be stored in a non-transitory computer-readable storage medium, and may be read into a computer and executed. The storage medium is not limited to a removable one, such as a magnetic disk (e.g., a flexible disk) or an optical disk (e.g., a CD-ROM or a DVD-ROM), but may be a fixed storage medium, such as a hard disk device or a solid state drive (SSD) using memory. That is, information processing performed by software may be specifically implemented by using hardware resources. Additionally, the software processing may be implemented in a circuit, such as an FPGA, and executed by hardware. The job may be executed by using, for example, an accelerator such as a graphics processing unit (GPU).

For example, by reading dedicated software stored in a computer-readable storage medium, a computer may be the device according to the above-described embodiment. The type of the storage medium is not particularly limited. Additionally, by installing dedicated software, downloaded through a communication network, in a computer, the computer may be used as the device according to the above-described embodiment. Thus, information processing performed by software is specifically implemented by using hardware resources.

Figure 13:
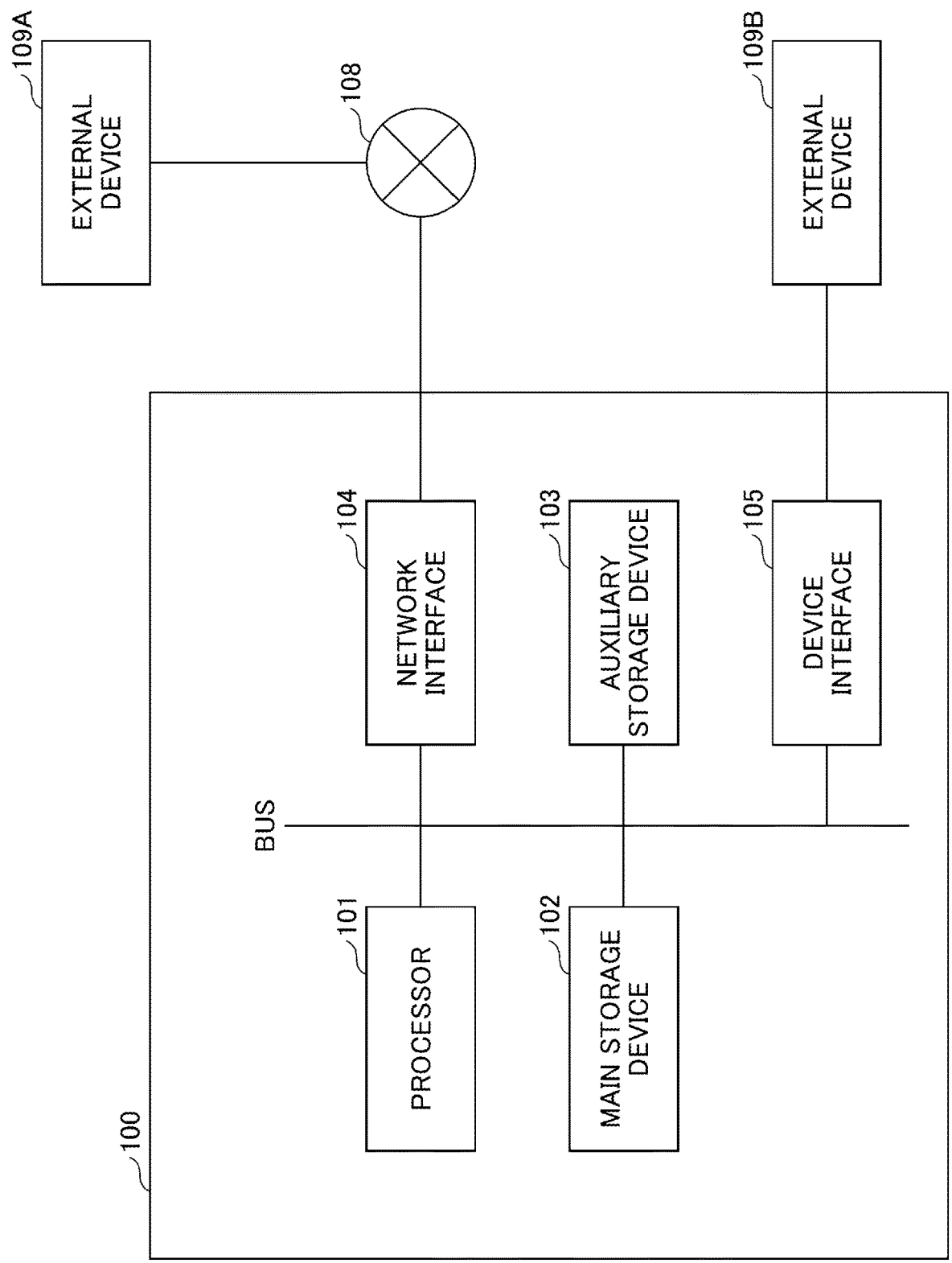
FIG. 13 is a block diagram illustrating a hardware configuration of a parallelization axes combination determining device according to the embodiment of the present disclosure.

FIG. 13 is a block diagram illustrating an example of a hardware configuration of the parallelization axes combination determining device 100 according to the embodiment of the present disclosure. The parallelization axes combination determining device 100 includes a processor 101, a main storage device 102, an auxiliary storage device 103, a network interface 104, and a device interface 105, and may be implemented as a computer device in which these components are connected through a bus 106.

Here, the parallelization axes combination determining device 100 of FIG. 13 includes one of each component, but may include multiple units of the same component. Additionally, although a single parallelization axes combination determining device 100 is illustrated, software may be installed in multiple computer devices and each of the multiple parallelization axes combination determining devices 100 may perform a different part of a process of the software. In this case, each of the multiple parallelization axes combination determining devices 100 may communicate through the network interface 104 or the like.

The processor 101 is an electronic circuit (processing circuit or processing circuitry) including a controller and the arithmetic unit of the parallelization axes combination determining device 100. The processor 101 performs arithmetic processing based on data or programs input from each device in the internal configuration of the parallelization axes combination determining device 100 and outputs an arithmetic result or a control signal to each device or the like. Specifically, the processor 101 controls the components constituting the parallelization axes combination determining device 100 by executing an operating system (OS), an application, and the like of the parallelization axes combination determining device 100. The processor 101 is not particularly limited as long as the above-described processing can be performed. The parallelization axes combination determining device 100 and respective components thereof may be achieved by the processor 101. Here, the processing circuit may refer to one or more electrical circuits disposed on one chip, or may refer to one or more electrical circuits disposed on two or more chips or devices. When multiple electronic circuits are used, each electronic circuit may be communicated by wire or wirelessly.

The main storage device 102 is a storage device that stores instructions executed by the processor 101, various data, and the like, and information stored in the main storage device 102 is directly read by the processor 101. The auxiliary storage device 103 is a storage device other than the main storage device 102. These storage devices indicate any electronic component that can store electronic information, and may be either a memory or a storage. The memory may be either a volatile memory or a non-volatile memory. The memory that stores various data in the parallelization axes combination determining device 100 may be implemented by the main storage device 102 or the auxiliary storage device 103. For example, at least a part of the memory may be implemented in the main storage device 102 or the auxiliary storage device 103. As another example, if an accelerator is provided, at least a part of the memory described above may be implemented in a memory provided in the accelerator.

The network interface 104 is an interface for connecting to the communication network 200 wirelessly or by wire. The network interface 104 may be compliant with existing communication standards. By using the network interface 104, information may be exchanged with the external device 109A communicably connected through the communication network 108.

The external device 109A may include, for example, a camera, a motion capture device, an output destination device, an external sensor, an input source device, and the like. The external device 109A may also be a device having a function of a portion of a component of the parallelization axes combination determining device 100. The parallelization axes combination determining device 100 may receive a portion of the processing results of the parallelization axes combination determining device 100 through the communication network 108, such as a cloud service.

The device interface 105 is an interface such as a universal serial bus (USB) that directly connects to the external device 109B. The external device 109B may be either an external storage medium or a storage device. The memory may be implemented by the external device 109B.

The external device 109B may be an output device. The output device may be, for example, a display device that displays an image, a device that outputs an audio or the like, or the like. Examples of the output device may include a liquid crystal display (LCD), a cathode ray tube (CRT), a plasma display panel (PDP), an organic electro luminescence (EL) display, a speaker, and the like, but are not limited to these.

The external device 109B may be an input device. The input device includes a device such as a keyboard, a mouse, a touch panel, a microphone, or the like to provide information input by these devices to the parallelization axes combination determining device 100. Signals from the input device are output to the processor 101.

For example, the data transfer time calculating unit 110 and the optimum parallelization axes combination determining unit 120 of the parallelization axes combination determining device 100 according to the present embodiment may be implemented by the processor 101. Additionally, the memory of the parallelization axes combination determining device 100 may be implemented by the main storage device 102 or the auxiliary storage device 103. The parallelization axes combination determining device 100 may include one or more memories.

In the present specification, the expression "at least one of a, b and c" or "at least one of a, b or c" includes any combination of a, b, c, a-b, a-c, b-c, a-b-c. The expression also includes a combination with multiple instances of any element, such as a-a, a-b-b, a-a-b-b-c-c. Further, the expression includes adding an element other than a, b and/or c, such as a-b-c-d.

Although the embodiment of the present disclosure has been described in detail above, the present disclosure is not limited to the specific embodiment described above, and various modifications and alterations can be made within the scope of the subject matter of the present disclosure as recited in the claims.

What is claimed is:

1. A method by a computing system including one or more processors and a hierarchical memory computer including three or more memory layers, the method comprising:
    calculating, by the one or more processors, data related to a first data transfer time for each of a plurality of parallelization axes combinations, wherein each of the plurality of parallelization axes combinations determines a method of splitting a computational target at each of the three or more memory layers, and the data related to the first data transfer time is calculated based on data related to a plurality of second data transfer times calculated for different pairs of two memory layers among the three or more memory layers; and
    performing, by the hierarchical memory computer, a computation of the computational target based on a selected parallelization axes combination that is selected from among the plurality of parallelization axes combinations,
    wherein the selected parallelization axes combination is selected based on the data related to the first data transfer time calculated for each of the plurality of parallelization axes combinations,
    wherein the data related to the first data transfer time is a maximum value of the data related to the plurality of second data transfer times,
    wherein the hierarchical memory computer is a computer that is configured to start communication between a combination of memory layers among the three or more memory layers before completing communication between another combination of memory layers among the three or more memory layers.

2. The method as claimed in claim 1, wherein the computational target is a matrix, and each of the plurality of parallelization axes combinations determines a method of splitting the matrix in either a row direction or a column direction at each of the three or more memory layers.

3. The method as claimed in claim 1, wherein the three or more memory layers include at least a first layer, a second layer, and a third layer, and the data related to the plurality of second data transfer times includes at least data related to the data transfer time between the first layer and the second layer and data related to the data transfer time between the second layer and the third layer.

4. A method by a computing system including one or more processors and a hierarchical memory computer including three or more memory layers, the method comprising:
    calculating, by the one or more processors, data related to a first data transfer time for each of a plurality of parallelization axes combinations, wherein each of the plurality of parallelization axes combinations determines a method of splitting a computational target at each of the three or more memory layers, and the data related to the first data transfer time is calculated based on data related to a plurality of second data transfer times calculated for different pairs of two memory layers among the three or more memory layers; and
    performing, by the hierarchical memory computer, a computation of the computational target based on a selected parallelization axes combination that is selected from among the plurality of parallelization axes combinations,
    wherein the selected parallelization axes combination is selected based on the data related to the first data transfer time calculated for each of the plurality of parallelization axes combinations,
    wherein the data related to the first data transfer time is a sum of the data related to the plurality of second data transfer times, and
    wherein the hierarchical memory computer is a computer that is incapable of starting communication between a combination of memory layers among the three or more memory layers until completing communication between other combination of memory layers among the three or more memory layer.

5. The method as claimed in claim 1, wherein the one or more processors determine a data transfer method between two memory layers among the three or more memory layers and calculates the data related to the second data transfer time based on the determined data transfer method.

6. The method as claimed in claim 1, wherein the computational target is a layer included in a neural network.

7. The method as claimed in claim 1, wherein a parallelization axis included in the parallelization axes combinations includes at least one of a batch direction, a spatial direction, or a channel direction.

8. A computing system comprising:
    one or more processors and
    a hierarchical memory computer including three or more memory layers, wherein the one or more processors are configured to:
        calculate data related to a first data transfer time for each of a plurality of parallelization axes combinations, wherein each of the plurality of parallelization axes combinations determines a method of splitting a computational target at each of the three or more memory layers, and the data related to the first data transfer time is calculated based on data related to a plurality of second data transfer times calculated for different pairs of two memory layers among the three or more memory layers, wherein the hierarchical memory computer is configured to:
        perform a computation of the computational target based on a selected parallelization axes combination that is selected from among the plurality of parallelization axes combinations,
        wherein the selected parallelization axis combination is selected based on the data related to the first data transfer time calculated for each of the plurality of parallelization axes combinations,
        wherein the data related to the first data transfer time is a maximum value of the data related to the plurality of second data transfer times, and
        wherein the hierarchical memory computer is a computer that is configured to start communication between a combination of memory layers among the three or more memory layers before completing communication between another combination of memory layers among the three or more memory layers.

9. The computing system as claimed in claim 8, wherein the computational target is a matrix, and each of the plurality of parallelization axes combinations determines a method of splitting the matrix in either a row direction or a column direction at each of the three or more memory layers.

10. The computing system as claimed in claim 8, wherein the three or more memory layers include at least a first layer, a second layer, and a third layer, and the data related to the plurality of second data transfer times includes at least data related to the data transfer time between the first layer and the second layer and data related to the data transfer time between the second layer and the third layer.

11. A computing system comprising:
one or more processors and
a hierarchical memory computer including three or more memory layers, wherein the one or more processors are configured to:
calculate data related to a first data transfer time for each of a plurality of parallelization axes combinations, wherein each of the plurality of parallelization axes combinations determines a method of splitting a computational target at each of the three or more memory layers, and the data related to the first data transfer time is calculated based on data related to a plurality of second data transfer times calculated for different pairs of two memory layers among the three or more memory layers, wherein the hierarchical memory computer is configured to:
perform a computation of the computational target based on a selected parallelization axes combination that is selected from among the plurality of parallelization axes combinations,
wherein the selected parallelization axis combination is selected based on the data related to the first data transfer time calculated for each of the plurality of parallelization axes combinations,
wherein the data related to the first data transfer time is a sum of the data related to the plurality of second data transfer times, and
wherein the hierarchical memory computer is a computer that is incapable of starting communication between a combination of memory layers among the three or more memory Layers until completing communication between other combination of memory layers among the three or more memory layers.

12. The computing system as claimed in claim 8, wherein the one or more processors determine a data transfer method between two memory layers among the three or more memory layers and calculates the data related to the second data transfer time based on the determined data transfer method.

13. The computing system as claimed in claim 8, wherein the computational target is a layer included in a neural network.

14. The computing system as claimed in claim 8, wherein a parallelization axis included in the parallelization axes combinations includes at least one of a batch direction, a spatial direction, or a channel direction.

* * * * *